United States Patent [19]
Henney et al.

[11] 3,811,928
[45] May 21, 1974

[54] SILICON NITRIDE CERAMICS

[75] Inventors: John William Henney, Abingdon; James William Samuel Jones, Blewbury, both of England

[73] Assignee: United Kingdom Atomic Energy Authority, London, England

[22] Filed: Oct. 15, 1971

[21] Appl. No.: 189,583

[30] Foreign Application Priority Data
Oct. 20, 1970 Great Britain.................. 49855/70

[52] U.S. Cl.................. 117/106, 117/125, 106/69, 117/DIG. 10, 117/DIG. 12
[51] Int. Cl............................................ C04b 35/58
[58] Field of Search ......... 106/55, 39 R, 39, 12, 52, 106/44, 55, 69; 117/219, 229, 106, 123, 125, 169, DIG. 10, DIG. 12, 215

[56] References Cited
UNITED STATES PATENTS

| | | |
|---|---|---|
| 3,468,992 | 9/1969 | Lubatti et al..................... 106/44 X |
| 3,222,438 | 12/1965 | Parr et al............................. 106/55 |
| 3,394,026 | 7/1968 | Parr et al........................ 117/169 R |
| 3,226,194 | 12/1965 | Kuntz............................. 117/106 R |
| 3,460,987 | 8/1969 | McMillan et al. .................. 117/219 |
| 3,428,466 | 2/1969 | Wolf et al. ........................ 106/39 R |
| 2,844,637 | 7/1958 | Borel et al. ........................... 106/52 |
| 3,238,085 | 3/1966 | Hayami et al....................... 106/39 |
| 2,618,565 | 11/1952 | Nicholson............................. 106/44 |
| 2,731,359 | 1/1956 | Nicholson.................... 117/DIG. 12 |

Primary Examiner—Douglas J. Drummond
Assistant Examiner—M. G. Wityshyn
Attorney, Agent, or Firm—Larson, Taylor and Hinds

[57] ABSTRACT

Shaped ceramic objects of silicon nitride are protected from oxidation by a coating comprising silica and boric oxide. The coating may be formed by heating a shaped mixture of silicon nitride and boron nitride in air to convert part to silica and boric oxide and causing a silica/boric oxide glass to flux and protect the object from further oxidation. The boron may be incorporated during oxidation but is preferably added to the silicon before nitriding.

8 Claims, 1 Drawing Figure

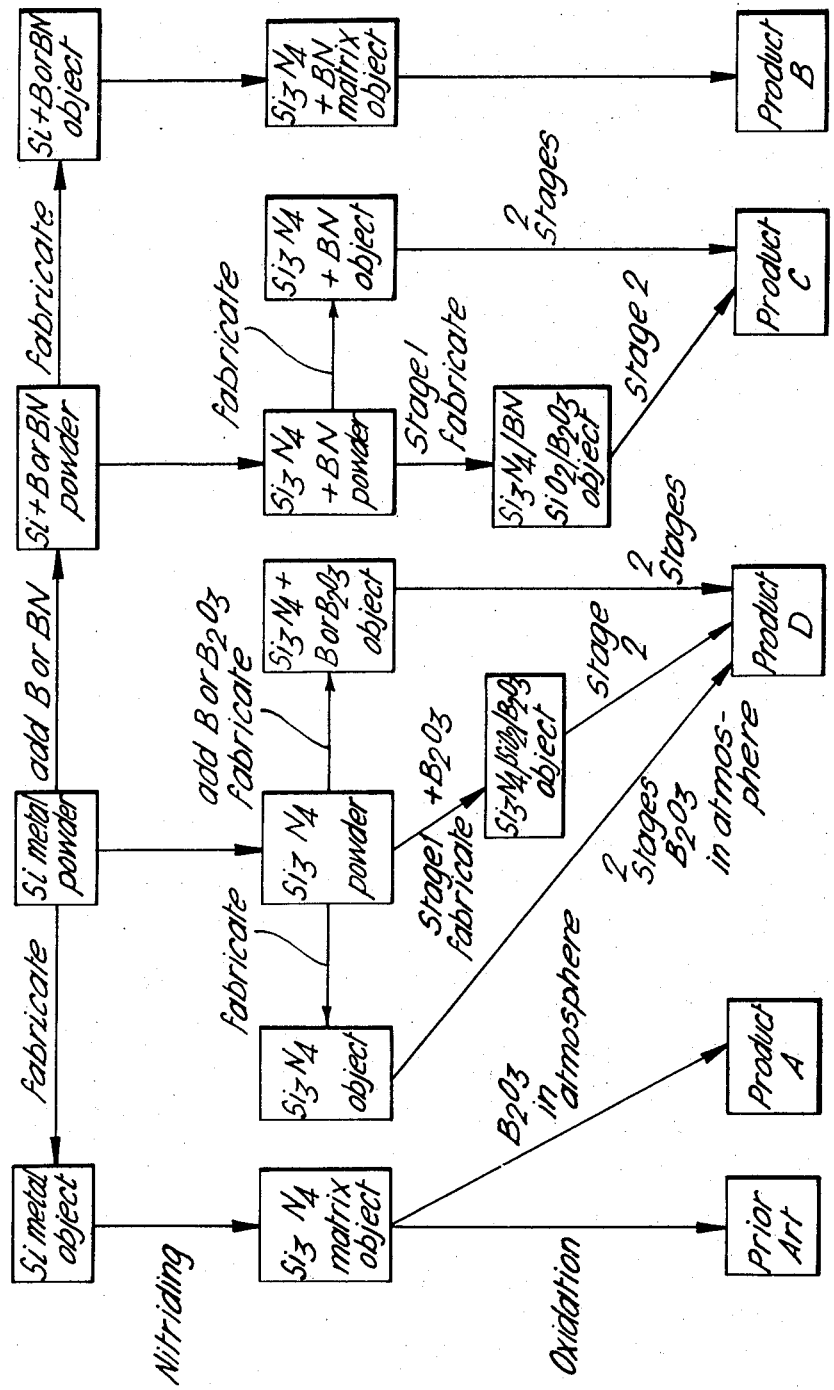

SILICON NITRIDE CERAMICS

Silicon nitride is a useful ceramic material. It is strong and has a very low coefficient of thermal expansion. Its utility is however limited by the fact that it is liable to oxidation at elevated temperatures in air. We believe that oxygen reacts with surface silicon nitride ($Si_3N_4$) with the formation of crystalline $SiO_2$ mainly as Cristobalite which partially protects the remaining $Si_3N_4$ from the atmosphere. Unfortunately, Cristobalite undergoes a phase change at about 230°C. which is accompanied by a substantial volume change and causes cracking of the protective layer, with a consequent loss of strength so leaving the $Si_3N_4$ once again open to oxidative attack from the atmosphere.

This invention relates to $Si_3N_4$ ceramics, and to methods of making them, in which the protective layer is modified to mitigate or avoid the above disadvantage.

In one aspect the present invention provides a ceramic shaped object comprising $Si_3N_4$ and possibly BN protected from oxidation by a coating comprising $SiO_2$ and $B_2O_3$.

In another aspect, the present invention provides a method of making the ceramic shaped object defined above, which method comprises oxidizing silicon nitride ($Si_3N_4$) under conditions to convert a part thereof to $SiO_2$, boron being either provided in the material prior to oxidation or added to the material during oxidation, and heating the object so as to cause a $SiO_2/B_2O_3$ glass to flux and protect the object from further oxidation.

The silicon nitride will generally be made by nitriding silicon metal. It is preferred to add the boron, either as the element or as BN to Si metal powder, because more homogeneous mixtures of the nitrides are obtained in this way.

It is a further feature of this invention that one or more other materials, particularly Fe, Mg, Al, $Al_2O_3$, MgO, CaO, BaO, ZnO or $ZrO_2$, may be added to the silicon nitride, or more preferably to the silicon prior to nitriding, in an amount of up to 10 percent by weight on the weight of the final product. It is believed that CaO and BaO have the effect of suppressing the volatilisation of $B_2O_3$. It is believed that the listed materials can have the effect of crystallising what would otherwise normally be a $SiO_2/B_2O_3$ glass. Provided that the crystalline material does not undergo a phase and volume change on cooling (this is the disadvantage of pure $SiO_2$), this modification can have the effect of improving the high temperature properties of the ceramic. However, it is important that the coefficient of thermal expansion of the second phase must be a reasonable match for the $Si_3N_4$ ($2.5 \times 10^{-6}/°C$.) if the body is to retain a high strength. The thermal expansion of $SiO_2$ itself is very low (apart from the sudden volume change at 230°C.) but is substantially increased by small addition of most other glass-making additives. $B_2O_3$ is peculiar in that additions do not increase, and may even decrease, the thermal expansion of $SiO_2$. The $SiO_2/B_2O_3$ coating should preferably not have a coefficient of thermal expansion above $3 \times 10^{-6}/°C$.

The above overall definitions cover a number of products which may be made by various methods according to the invention. These will now be described in turn. Reference is directed to the accompanying drawing, which is a diagram showing the various steps that can be taken. At the bottom of the diagram are five products, one of which is conventional and contains no boron, and four of which are lettered A, B, C and D and are within the scope of this invention. Basically, all the preparative methods described start from silicon metal powder, and involve two main steps, that is to say, nitriding and oxidation, with boron being added to the silicon in some form before or during the nitriding or the oxidation stages. Product C is the preferred product.

All the preparative methods involve fabricating powders into shaped objects. Fabrication may be achieved by normal powder ceramic fabrication processes, which are well known in the art. The method of fabrication of powder into shaped objects is not relevant to this invention, and will not be further described herein.

Product A.

The first stage in the manufacture of this product is the preparation from silicon metal powder of a shaped object of $Si_3N_4$, by first fabricating the silicon metal powder into a shaped object and then nitriding the object. This is conventional.

In the nitriding step, the shaped object is heated in $N_2$ at a temperature below the melting point of Si (1,410°C.), usually at 1,300°C. to 1,350°C. for long enough to form a $Si_3N_4$ matrix. The temperature is then further raised to, for example 1,450°C. to complete the nitriding. Unchanged Si may melt at this higher temperature, but the $Si_3N_4$ matrix keeps the object rigid until nitriding is complete. If the ceramic product is to be of high strength, the nitriding step must be taken to substantial completion.

The heating time for this nitriding step depends on the size of the object. Large objects may require to be heated, for example, for 10 hours at 1,350°C. followed by 24 hours at 1,450°C. Smaller objects, for instance cylindrical pellets 1 cm. in diameter by ½ cm. long, may be completely nitrided after 2 hours at 1,350°C. followed by 10 hours at 1,450°C.

These long times and high temperatures are expensive on both power and equipment. The nitriding step in fact represents a major part of the cost of making $Si_3N_4$ ceramic articles. It is therefore preferable that nitriding should be carried out on a material in finely divided form, e.g. powder or pellets. It is a disadvantage of product A (and of product B — see below) that its manufacture requires the nitriding of large shaped objects.

After nitriding, the shaped object consists of a 3-dimensional matrix of $Si_3N_4$. This is then oxidised according to the invention in an oxidising atmosphere (conveniently air) containing $B_2O_3$. Oxidation is preferably effected at a temperature of from 1,150° to 1,350°C. At temperatures of this order, it is believed that $Si_3N_4$ on the surface of the object is oxidised to $SiO_2$ which absorbs $B_2O_3$ from the atmosphere to give a glass that fluxes to form a continuous gas-impermeable layer over the entire object; this glass having the advantage over Cristobalite that it does not crack as a result of phase changes during cooling.

At oxidation temperatures below 1,150°C., the glass may not flux adequately to give an impermeable layer. At oxidation temperatures above 1,350°C., the $B_2O_3$ may be too volatile to condense with the $SiO_2$. Oxidation may conveniently be effected in a closed vessel in which boron or $B_2O_3$ has been placed with the shaped $Si_3N_4$ object. Generally, the oxide layer will constitute up to 5 percent, e.g. 1 percent to 5 percent of the weight of the object and will contain from 1 percent to 20 percent by weight of $B_2O_3$.

Product A, prepared as described above, is a shaped object consisting essentially of a matrix of $Si_3N_4$ and a gas-impermeable surface layer comprising $SiO_2$ and $B_2O_3$.

EXAMPLE 1

A specimen of $Si_3N_4$ (density 2.2 g/cc) was heated in a closed alumina crucible with $B_2O_3$ vapour for 1 hour at 1,350°C. On cooling no crystalline $SiO_2$ was detected on the specimen surface and the Modulus of Rupture was 15,500 p.s.i.

A similar specimen heated without $B_2O_3$ vapour present had a surface layer of $\alpha$ Cristobalite on cooling and an M-O-R of 7,700 p.s.i.

Product B.

The preparation of product B is similar to that described for product A, except that the boron is added to the Si before the nitriding step, rather than during oxidation.

To silicon metal powder is added boron, either as the element or as BN, preferably in a proportion of from 1 percent to 20 percent, e.g., 2 percent to 10 percent of boron by weight on the weight of the Si. The powdered mixture is fabricated into a shaped object, which is then nitrided. The nitriding step forms no part of this invention, and has already been discussed above in relation to product A. It is merely necessary to add that the presence of boron does not alter the nitriding conditions, and that elemental boron is nitrided along with the silicon. However, the heating rate to 1,100°C. should not exceed 200°C./h if no dimensional change is to occur.

After nitriding, the shaped object consists of a three-dimensional matrix of essentially $\beta$ $Si_3N_4$ in which there is incorporated a minor proportion of BN. This is then oxidised, conveniently in air, preferably at a temperature of from 1,150° to 1,350°C. At temperatures of this order, it is believed that $Si_3N_4$ and BN on the surface of the object are oxidised to $SiO_2$ and $B_2O_3$ respectively, to give a glass that fluxes to form a continuous gas-impermeable layer over the entire object; this glass having the advantage over Cristobalite that it does not crack as a result of phase changes during cooling.

At oxidation temperatures below 1,150°C., the glass may not flux adequately to give an impermeable layer. At oxidation temperatures above 1,350°C., $B_2O_3$ is rather volatile. Generally, the oxide layer will constitute up to 5 percent, e.g. 1 percent to 5 percent, of the weight of the object.

Product B, prepared as described above, is a shaped object consisting essentially of a matrix of $Si_3N_4$, in which there is incorporated a minor proportion of BN, and a gas-impermeable surface layer comprising $SiO_2$ and $B_2O_3$.

Product C.

This product differs from products A and B in that fabrication of the shaped object is not effected until nitriding is complete. This reduces the costs of nitriding, and also has other advantages as discussed below.

To silicon metal powder is added boron, either as the element or as BN, preferably in a proportion of from 1 percent to 20 percent, e.g. 2 percent to 10 percent, of boron by weight on the weight of the Si. This mixture is nitrided conveniently as a powder or in the form of pellets. The nitriding step forms no part of this invention, and has already been discussed in relation to product A. The resulting mixture of $Si_3N_4$ and BN, if not already in powder form, will generally need to be powdered for further use. This mixture, containing up to 20 percent of boron by weight on the weight of the Si, is believed to be novel, and forms a subsidiary aspect of our invention. BN is somewhat soluble in $Si_3N_4$, and tends to stabilise the $\beta$ $Si_3N_4$ phase.

As can be seen from the diagram, it is possible to proceed in either of two ways from this point. According to one alternative, the powdered $Si_3N_4$/BN mixture is fabricated into a shaped object which is then heat treated. Heat treatment is preferably carried out in two stages, the first stage in an oxidising atmosphere, conveniently air, below about 1,150°C., e.g. at a temperature of from 900° to 1,150°C., preferably 1,000° to 1,100°C., and the second stage, optionally, but not necessarily, in an oxidising atmosphere, above about 1,150°C., e.g., at a temperature of from 1,150°C. to 1,400°C., preferably 1,200°C. to 1,350°C. The changes which occur during heat treatment are believed to be as follows.

During the first stage, oxygen permeates the entire body and slowly oxidises $Si_3N_4$ to $SiO_2$ and BN to $B_2O_3$, the two oxides combining to form a glass. These reactions continue throughout the first stage. The amount of glass formed is therefore determined by the length of time for which the object is held at from 900° to 1150°C. When the temperature is subsequently raised to from 1,150° to 1,400°C., the glass fluxes and forms a gas-impermeable coating round the remaining $Si_3N_4$ and BN, protecting them from further oxidation. It is probable that some $Si_3N_4$ also dissolves in the glass at the higher oxidation temperatures, and subsequently precipitates out on cooling in the form of a three-dimensional matrix.

The time for which the object is held at an elevated temperature during the oxidation stage of heat treatment depends on temperature chosen and on the amount of glass (discussed below) which is desired in the product. Times of from 10 seconds at 1,150°C. to 12 hours at 900°C. are likely to be appropriate. While it is preferred to hold the object at a temperature in the range 900° to 1,150°C. for a definite length of time, before heating further, it may under some circumstances be sufficient to simply heat the object up to a temperature in the range 1,150° to 1,400°C., the unavoidable heating time during which the object is at a temperature of from 900°C. to 1,150°C. constituting the oxidation stage of the heat treatment.

The holding time for the second stage of the heat treatment should be sufficient to achieve equilibrium in the object resulting from fluxing of the $SiO_2$/$B_2O_3$ glass and solution of the $Si_3N_4$ therein. Preferred holding times range from ½ hour upwards, depending on the size of the object, e.g. 2 hours.

As stated above, there is an alternative route by which product C may be obtained from the powdered mixture of $Si_3N_4$ and BN. This powder is subjected to the oxidation stage of the heat treatment described above; that is to say, it is heated in an oxidising atmosphere (conveniently air) at a temperature of not more than about 1,150°C., preferably 900° to 1,150°C., e.g. 1,000° to 1,100°C., for a time sufficient to form the desired amount of oxide glass by oxidation of $Si_3N_4$ to $SiO_2$ and BN to $B_2O_3$. This product is cooled and ground. Apart from the need to give sufficient time for oxidation and reaction the heating and cooling can be very rapid. It is a mixture of $Si_3N_4$, $SiO_2$, BN and $B_2O_3$, and constitutes another subsidiary aspect of our invention.

This mixture is fabricated into a shaped article which is subjected to the second stage of the heat treatment described above, that is to say, it is heated to a temperature above about 1,150°C., preferably 1,150° to 1,400°C., e.g. 1,200° to 1,350°C., to flux the glass and prevent further subsequent oxidation. It should be noted that this second stage heating need not be in an oxidising atmosphere; indeed it may be preferable to use an inert atmosphere to prevent further oxidation.

Product C, prepared as described above, consists essentially of a mixture of $\beta$ $Si_3N_4$ and BN bonded throughout by means of a glass comprising $SiO_2$ and $B_2O_3$, in which the $Si_3N_4$ probably forms a continuous matrix. The product has the interesting property of becoming ductile when the glass softens at elevated temperatures of the order of 1,100° to 1,300°C., thus opening up possibilities of making further shapes by forging or hot-pressing processes, or of welding products. We have successfully welded products of this kind at temperatures of the order of 1,400°C. using an oxyacetylene torch. This property of ductility also means that high temperature failure of a component (e.g. a turbine blade) in service is likely to be by distortion or creep, rather than by break-up, which may be advantageous.

Ductility of this product is a function of $SiO_2/B_2O_3$ glass content. The proportion of glass to nitride in the product is not critical, in the sense that useful products are obtained with a wide range of glass contents, but is likely to be in the range of 50:50 to 5:95, e.g. 40:60 to 20:80, expressed by weight as $(SiO_2/B_2O_3):(Si_3N_4/BN)$.

The incorporation of a minor amount of one or more further materials, e.g. Fe, Mg, Al, $Al_2O_3$, MgO, CaO, BaO, ZnO or $ZrO_2$ in the product, as described above, can have the effect of increasing or decreasing the temperature at which ductility becomes apparent. For example, the addition of small amounts of MgO and $Al_2O_3$ to the silicon metal powder before nitriding can increase the temperature at which ductility appears from about 1,200° to about 1,400°C.

EXAMPLE 2

A 95:5 $^w/o$ Si:B mixture was nitrated for 2h at 1,350°C. and 10h at 1,450°C. to give a product consisting essentially of $\beta$ $Si_3N_4$ with a small amount of BN. This was ground to powder (− 300 mesh B.S.S.) and cold compacted at 10,000 p.s.i. to form rectangular specimens 2.5 × 0.6 × 0.3 cm. These were heated in air as described below and had the average properties given in the Table.

| | Firing Schedule | Estimated Glass Content | Density | % Porosity | Modulus of Rupture, p.s.i. 20°C. | 1000°C. | |
|---|---|---|---|---|---|---|---|
| (1) | Rise of temp. 20°C/min. Held 2h at 1050°C. and 2h at 1350°C. | 30 $^r/o$ | 2.6 g/cc | 5 | 15000 | 18000 | Ductile at 1050°C. |
| (2) | Rise of temp. 30°C/min. Held 1h at 1350°C. | 20 $^r/o$ | 2.3 g/cc | 20 | 13000 | 14000 | Ductile at 1150°C. |
| (3) | Rise of temp. 15°C/min. Held 1h at 1350°C. | 25 $^r/o$ | 2.2 g/cc | 23 | 13000 | 14000 | Ductile at 1050°C. |

Resistance to further oxidation was demonstrated by specimens from (2) which increased in weight by less than 1 percent on being heated in water saturated oxygen for 120h at 1,250°C.

Resistance to thermal shock was demonstrated by specimens from (3) which underwent six cycles of rapid heating and cooling (1,000°C/min.) in air between 50° and 800°C. without any loss of strength.

A further six cycles in which the specimens were quenched in water lowered their modulus of rupture to about half its previous value.

Product D.

The first step in the preparation of product D is the conventional nitriding of silicon metal, conveniently in powder or pellet form. The nitriding step has already been discussed in relation to product A. The resulting $Si_3N_4$, if not already in powder form, will generally need to be powdered for further use.

As can be seen from the diagram, it is possible to proceed in any one of three ways from this point. According to the first alternative, the $Si_3N_4$ powder is fabricated into a shaped object. It may be mentioned that $Si_3N_4$ powder is difficult to sinter alone, so that the shaped object at this stage has low strength and needs careful handling.

The shaped object is then oxidised in an oxidising atmosphere (conveniently air) containing $B_2O_3$. The oxidising treatment is preferably the same as the two-stage treatment described in relation to product C. Apart from the fact that the $B_2O_3$ permeates the shaped object with the oxygen, rather than being formed in situ by oxidation of BN, the changes which take place during the treatment are believed to be essentially the same. That is to say, in the first stage, $Si_3N_4$ is slowly oxidised throughout the object to $SiO_2$ which combines with $B_2O_3$ vapour to form a glass. In the second stage, the glass fluxes and forms a gas-impermeable coating around the remaining $Si_3N_4$.

According to the second alternative, the $Si_3N_4$ powder is subjected to the oxidising stage of the two-stage heat treatment described above in relation to product C, except that the oxidising atmosphere also contains $B_2O_3$. The product is then cooled and ground. It is a mixture of $Si_3N_4$, $SiO_2$ and $B_2O_3$, and constitutes another subsidiary aspect of our invention. This mixture is then fabricated into a shaped article which is subjected to the second stage of the heat treatment described above in relation to product C.

According to the third alternative, the $Si_3N_4$ powder is mixed with boron, either as the element or in the form of $B_2O_3$. The resulting mixture is subjected to the two-stage heat treatment described above in relation to product C. The powdered mixture may be fabricated into a shaped object either before the oxidation stage of the heat treatment or between the first and second stages as previously described.

Product D, prepared as described above, consists essentially of $Si_3N_4$ bonded throughout by means of a glass comprising $SiO_2$ and $B_2O_3$, in which the $Si_3N_4$ probably forms a continuous matrix. The product is similar to product C, and in particular has the same property of ductility at elevated temperature.

We claim:

1. A ceramic shaped object consisting essentially of a matrix of $Si_3N_4$ protected from oxidation by a gas-impermeable surface layer comprising $SiO_2$ and $B_2O_3$, wherein the surface layer constitutes from 1 percent to 5 percent of the weight of the article and contains from 1 percent to 20 percent by weight of $B_2O_3$.

2. A ceramic shaped object as claimed in claim 1, comprising up to 10 percent of one or more of Fe, Mg, Al, $Al_2O_3$, MgO, CaO, BaO, ZnO and $ZrO_2$.

3. A ceramic shaped object consisting essentially of a matrix of $Si_3N_4$, in which there is incorporated BN in an amount of from 1 percent to 20 percent of boron by weight on the weight of the silicon, protected from oxidation by a gas-impermeable surface layer comprising $SiO_2$ and $B_2O_3$, wherein the surface layer constitutes from 1 percent to 5 percent of the weight of the article and contains from 1 percent to 20 percent by weight of $B_2O_3$.

4. A ceramic shaped object as claimed in claim 3, comprising up to 10 percent of one or more of Fe, Mg, Al, $Al_2O_3$, MgO, CaO, BaO, ZnO and $ZrO_2$.

5. A ceramic shaped object consisting essentially of a mixture of $Si_3N_4$ and BN protected from oxidation and bonded throughout by means of a glass comprising $SiO_2$ and $B_2O_3$, wherein
   a. the weight of boron is from 1 percent to 20 percent of the weight of the silicon, and
   b. the weight ratio of $(SiO_2/B_2O_3):(Si_3N_4/BN)$ is from 50:50 to 5:95.

6. A ceramic shaped object as claimed in claim 5, comprising up to 10 percent of one or more of Fe, Mg, Al, $Al_2O_3$, MgO, CaO, BaO, ZnO and $ZrO_2$.

7. A ceramic shaped object consisting essentially of $Si_3N_4$ protected from oxidation and bonded throughout by means of a glass comprising $SiO_2$ and $B_2O_3$, wherein
   a. the weight ratio of $(SiO_2/B_2O_3):Si_3N_4$ is from 50:50 to 5:95, and
   b. the said glass contains from 1 percent to 20 percent by weight of $B_2O_3$.

8. A ceramic shaped object as claimed in claim 7, comprising up to 10 percent of one or more of Fe, Mg, Al, $Al_2O_3$, MgO, CaO, BaO, ZnO and $ZrO_2$.

* * * * *